Nov. 5, 1935.  F. W. WALTER, JR  2,019,880
HYDRAULIC TRANSMISSION
Filed March 15, 1934  3 Sheets-Sheet 1
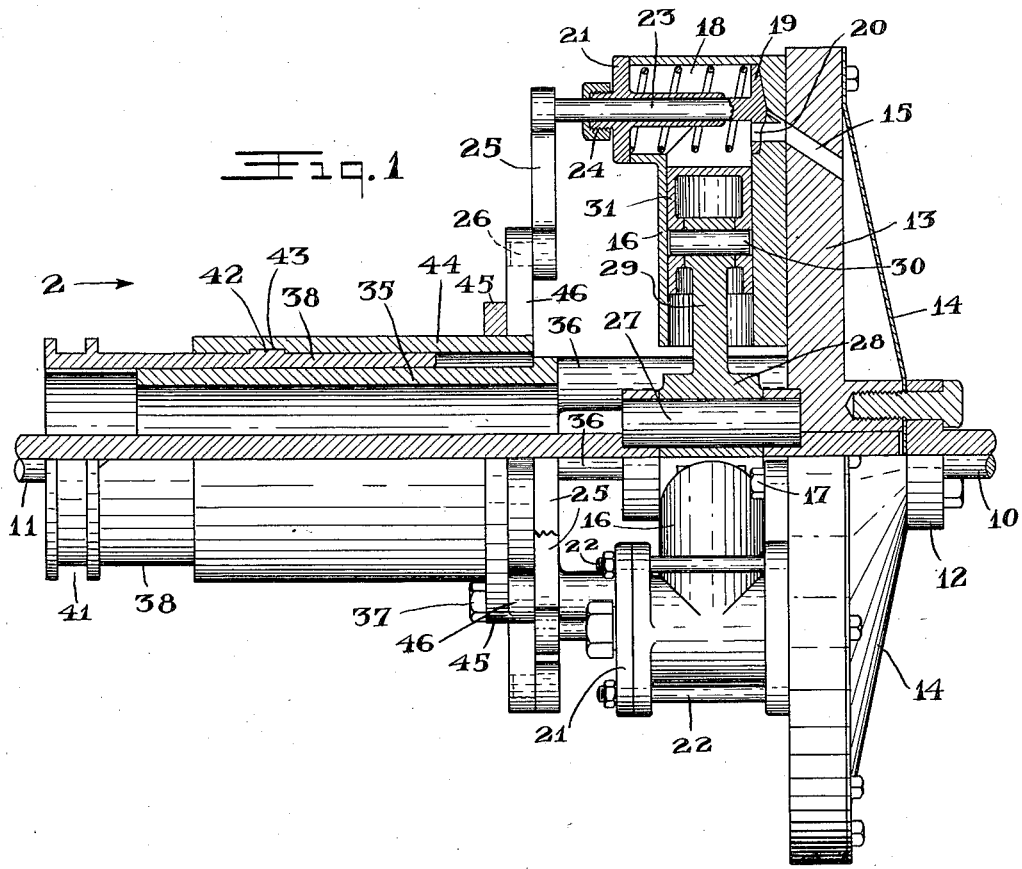
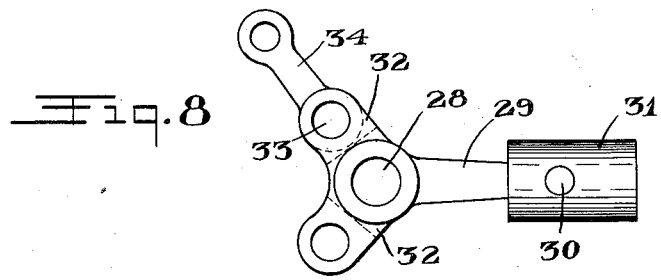
WITNESSES:
INVENTOR:
Frank W. Walter Jr.
BY
ATTORNEY

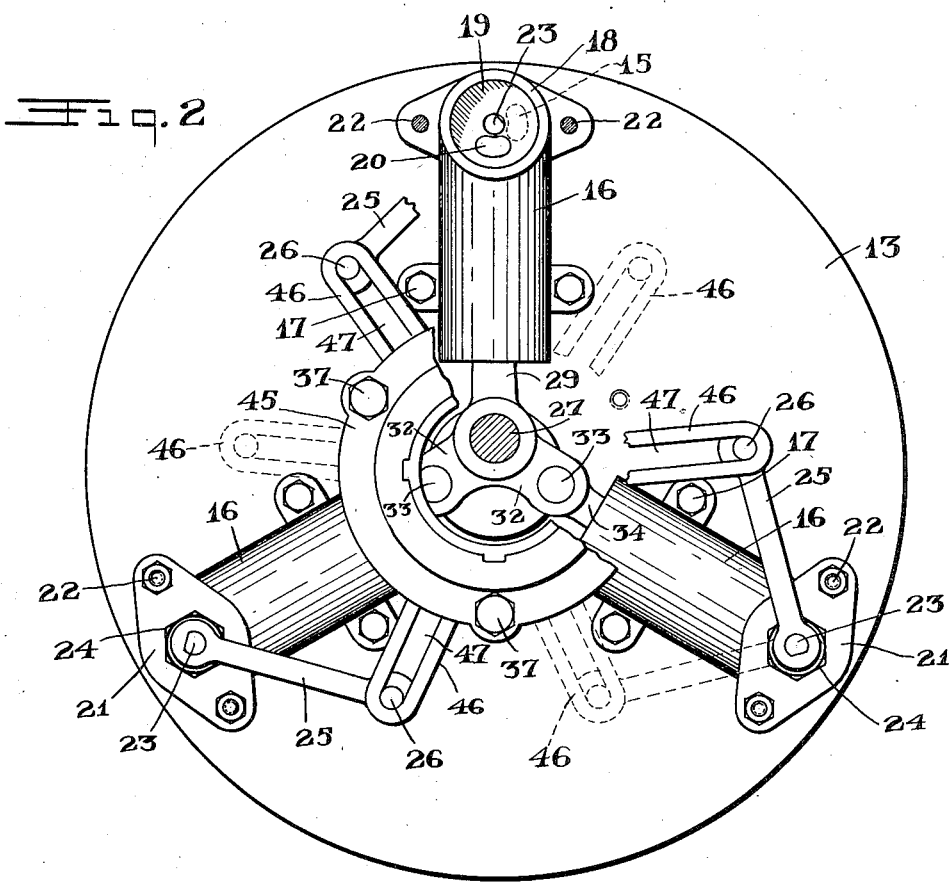
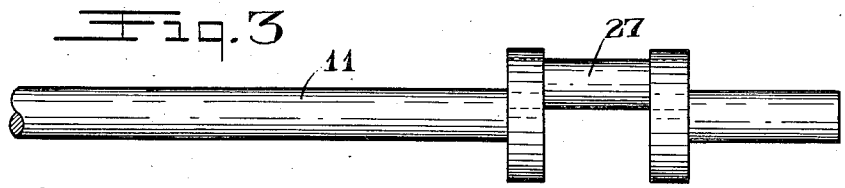

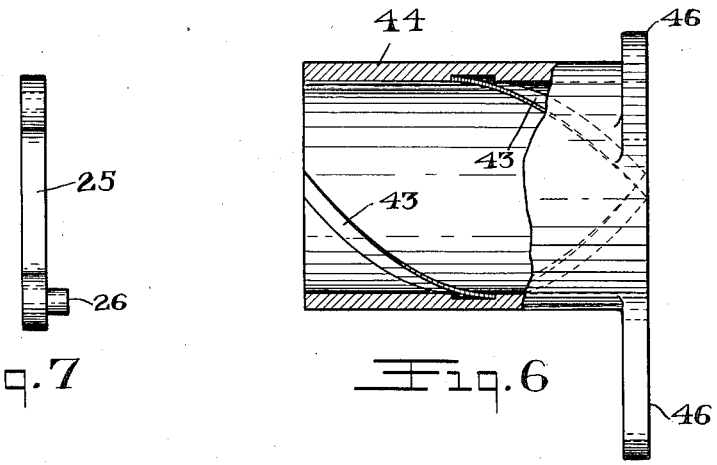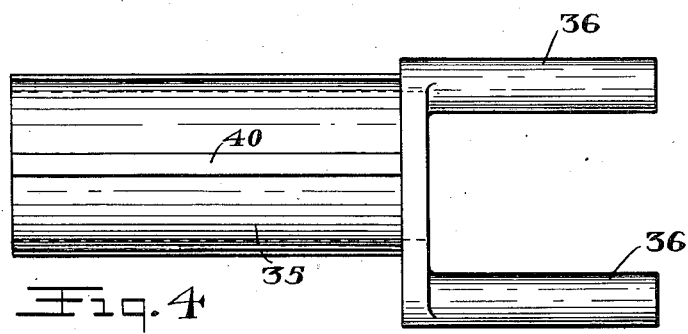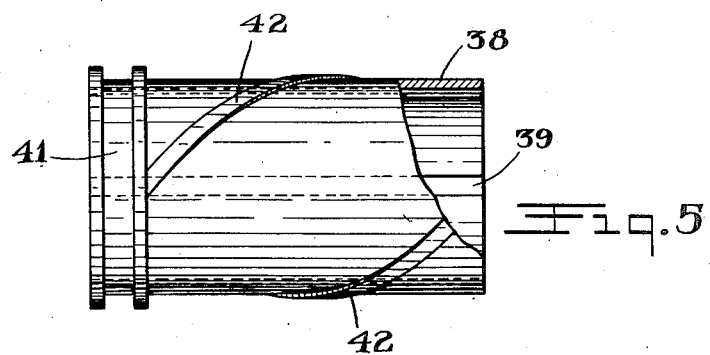

Patented Nov. 5, 1935

2,019,880

UNITED STATES PATENT OFFICE 2,019,880

HYDRAULIC TRANSMISSION

Frank W. Walter, Jr., Ventnor, N. J.

Application March 15, 1934, Serial No. 715,652

7 Claims. (Cl. 192—60)

This invention relates to hydraulic transmissions, and has for an object to provide improved hydraulic means for coupling a driving shaft and a driven shaft in variable speed relation.

A further object of the invention is to provide a transmission mechanism embodying radially disposed transmission units carried by the driving shaft, with improved interconnection between said units and the driven shaft.

A further object of the invention is to provide in combination with a driving shaft a balance wheel having secured thereto radially positioned cylinders and a reservoir, said cylinders rotating with the driving shaft and having connecting rods making connection with the driven shaft, with means for varying the speed relation through the medium of said cylinders.

The invention, therefore, comprises the aligned journaling of a driving shaft and a driven shaft, the driving shaft carrying, rigidly connected therewith, a balance wheel with a reservoir and a plurality of radially positioned cylinders, the cylinders being provided with pistons, making through the medium of connecting rods proper relation with the crank carried by the driven shaft, with valves controlling the conduit from the reservoir to the cylinders, and manual means for varying the positions of the valves to vary the registering conduit openings, whereby passage from the reservoir to the cylinders may be manually varied at will to any point between completely open and completely closed positions.

The drawings illustrate an embodiment of the invention and the views therein are as follows:

Figure 1 is a view of the transmission, one-half in elevation and one-half in diametrical section, Figure 2 is a view in end elevation in the direction indicated by arrow 2 at Figure 1, but with parts broken away to show underlying parts, Figure 3 is a view of the driven shaft and its crank, Figure 4 is a view of a sleeve which is rigidly attached to the driving shaft and rotates therewith and forms a passage for a driven shaft therethrough, Figure 5 is a view in side elevation with parts broken away of a sleeve which is slidably mounted upon the sleeve shown at Figure 4, Figure 6 is a view partly in side elevation and partly broken away of a sleeve which is mounted upon the sleeve shown at Figure 5 and is rotated thereby when the said sleeve shown at Figure 5 is slidably moved, Figure 7 is a view in elevation of one of the levers operating one of the valves, and Figure 8 is a view in elevation of one of the pistons with the bearing for the crank arm of the shaft and showing a connecting rod for another piston pivoted thereto.

Like characters of reference indicate corresponding parts throughout the several views.

The present invention is directed to means for coupling a driving shaft 10 to a shaft 11, which is driven from the shaft 10. The driving shaft 10 is provided with a hub 12 to which is rigidly secured or forming an integral part therewith a balance wheel 13. Surrounding the hub and having its edges secured to the balance 13 is a conically shaped reservoir 14 and a plurality of conduits 15 forming communication between said reservoir 14 and the cylinders 16, also rigidly secured to the drive wheel in any approved manner, as by the bolts 17.

At their outer ends, the cylinders are enlarged into valve chambers 18 which are in direct communication with the conduits 15 from the reservoir 14. Mounted within these chambers 18 are valves 19 having ports 20 properly proportioned to register at times with the conduits 15. These chambers 18 are provided with heads 21 which are held to position by bolts 22 which also assist the bolt 17 in maintaining the cylinders in fixed relation to the balance wheel.

The valve 19 is provided with a stem 23 which extends outwardly through the head 21 and through a gland 24 and is provided with a lever 25 fixed thereto. The several levers 25 extend normally radially relative to the balance wheel 13, but may be moved from such radial position in either direction, as indicated more particularly at Figure 2, and are provided at their ends opposite their connection with the valve stems 23 with the wrist pins 26.

The driven shaft 11 is provided with a crank 27. Thereon is journaled a bearing 28 which is formed rigid with a connecting rod 29 extending to a pin 30 and connecting thereby with a piston 31.

The bearing 28 is provided with offset arms 32 which are connected by pins 33 with other connecting rods 34 which in turn connect with pistons in others of the cylinders, not specifically shown in the drawings.

Connected with the balance wheel is a sleeve 35, such connection being in any approved manner, but here shown as by means of legs 36 (see Figure 4) which said legs are formed tubular with bolts 37 therethrough.

This sleeve 35 has a second sleeve 38 mounted longitudinally slidable thereon, such sliding provision being represented by the groove 39 and spline 40. While the groove 39 is shown in the sleeve 38 and the spline 40 upon the sleeve 35, it is obvious that these may be reversed or that other well known mechanical devices may be substituted therefor.

The sleeve 38 is provided with a furrow 41 for connection with the manual lever of the usual bifurcated type, not shown. The sleeve 38 is also provided with spiral ribs 42 which coact with spiral furrows 43 formed in a sleeve 44 which is mounted upon the exterior of the sleeve 38.

The sleeve 44 is, therefore, provided with means for rotation, but is held against longitudinal movement by means of a collar 45 which is held also by the bolts 37. The sleeve 44 has a plurality of radially extending arms 46 which are provided with slots 47 accommodating the wrist pins 26 of the levers 25, as shown more particularly at Figure 2.

In operation, the cylinders 16 will fill with the hydraulic fluid from the reservoir 14 through the passage 15 and valve 20, upon the reciprocation of the pistons in the cylinders, and assuming the port to be in register with the conduit. Thus arranged in register, the port and conduit are assumed to be of such size as to permit the comparatively free passage of the hydraulic fluid, offering little or no resistance to the reciprocation of the pistons in the cylinders.

As shown at Figure 1 the sleeve 42 is moved outwardly to or nearly to its outer limit, at which position, through the rotation of the sleeve 44 and the connection of the arms 46 with the levers 25 the valves 19 are positioned for the register of the ports 20 with the conduits 15.

This would be assumed to be the position of starting the prime mover which would be associated with the driving shaft 10 and would offer practically no resistance to the rotation of said driving shaft, the driven shaft 11 remaining stationary and the pistons reciprocating freely.

With the movement of the sleeve 42 manually toward the balance wheel 13 and through the medium of the interacting sleeves 35, 38 and 44, the valves 19 may be adjusted as found desirable, to any position between said completely open position, as shown at Figure 1, and the completely closed position as shown at Figure 2.

In the completely closed position as shown at Figure 2, the hydraulic fluid within the cylinders will be trapped therein and will lock the pistons against movement, whereby, of course, the driven shaft is locked into consonance with the driving shaft and rotates synchronously therewith.

It will be understood, of course, that at any point intermediate these two extremities of movement the port 20 will register to a greater or less extent with the conduit 15 and will, therefore, permit the passage of less or greater amounts of the fluid, whereby the coupling will be not complete but will rotate the driven shaft in decreasing speed relation to the driving shaft as the port is opened.

It is to be understood, of course, that the disclosure of tongue and groove connections, pin and slot connections, and the like, have been shown merely by way of illustration, and that the same principle will be in each case involved by a reversal of these parts, and that such reversal is fully within the scope of the present invention.

Of course, the hydraulic transmission mechanism herein set forth and hereinafter claimed may be modified and changed in various ways without departing from the invention illustrated and described.

I claim:—

1. The combination with a driving balance wheel, of a reservoir carried thereby, said balance wheel having conduits therethrough, a plurality of cylinders carried by the balance wheel and in communication with the conduits, a valve positioned to progressively open and close said conduit communication, pistons mounted to reciprocate within the cylinders, a driven shaft, crank means connecting the pistons with the driven shaft, a plurality of concentric sleeves embracing the driven shaft, means to manually reciprocate one of said sleeves, means to move another of said sleeves revolubly from said reciprocation, arms carried by said revolubly mounted sleeve, valve stems carried by said valves, and levers carried by said valve stems and actuated by said arms.

2. The combination with a driving balance wheel, of a reservoir carried thereby and extending adjacent to its perimeter, said balance wheel having conduits extending therethrough adjacent to its perimeter and in communication with the reservoir, a plurality of cylinders carried by the balance wheel and in communication with the conduits, a ported valve positioned to vary the amplitude of communication between the conduits and the cylinders, a driven shaft having a crank, a plurality of pistons mounted to reciprocate within the cylinders and having connection with the crank, a plurality of concentric sleeves embracing the driven shaft, one of which is rigidly connected to the balance wheel, a second one of said sleeves embracing said first mentioned sleeve and longitudinally slidable thereon, the third of said sleeves embracing said second sleeve, means carried by the second sleeve for imparting revoluble movement to the third sleeve, means to hold the third sleeve against longitudinal movement, radial arms carried by said third sleeve, and levers interconnecting said arms with the valve stems.

3. The combination with a driving shaft, of a balance wheel carried thereby, a reservoir carried by the drive wheel and having parts extending adjacent to the periphery thereof, said balance wheel being provided with conduits therethrough in communication with the reservoir, a plurality of cylinders radially mounted upon the balance wheel and each in communication by one of said conduits with the reservoir, a ported valve positioned to vary the amplitude of communication between the cylinders and the conduits, valve stems carried by said valves, and means to transmit manual stress to rotate said valve stems planetarily during the rotation of the balance wheel and cylinders.

4. The combination with a driving shaft, of a balance wheel rigidly carried thereby, a reservoir carried by said balance wheel, said balance wheel being provided with a plurality of conduits in communication with the reservoir, a plurality of cylinders radially carried by the balance wheel, a valve housing in communication with each of said cylinders, a valve mounted in each of said valve housings and yieldingly held to seat, said valve being provided with a port properly proportioned and positioned to register at times with the conduit, a valve stem carried by each of said valves, a piston mounted to reciprocate with a crank and journaled in said balance wheel, connecting rods connecting said pistons with said crank, radial arms rotatable with the shaft, manual means to advance and retard the rotation of the arms with respect to the balance wheel, and means connecting the arms and valve stems for actuating the valves to vary the port opening during the rotation of the valves and cylinders with the balance wheel.

5. The combination with a driving shaft, of a balance wheel rigidly carried thereby, a reservoir carried by the balance wheel, said balance wheel being provided with conduits in communication with the reservoir, a plurality of cylinders carried radially by the balance wheel, a valve housing carried by each of said cylinders and in communication with the radially outer end of said cylinder, a conical valve mounted within the housing and provided with a port adapted at times to register with the conduit, a valve stem carried by the valve and passing without the housing, a driven shaft having a crank, pistons mounted to reciprocate within the cylinders, connecting rods from said piston to said crank, and manual means oscillating about the center of rotation of the driving shaft for oscillating the valves the while the cylinders are rotating with the balance wheel.

6. The combination with a driving shaft, of a balance wheel rigidly carried thereby, a reservoir carried by said balance wheel, said balance wheel being provided with a plurality of conduits in communication with the reservoir, a plurality of cylinders radially carried by the balance wheel, a valve housing in communication with each of said cylinders, a valve mounted in each of said valve housings and yieldingly held to seat, said valve being provided with a port properly proportioned and positioned to register at times with the conduit, a valve stem carried by each of the valves and parallel with the shafts, a piston mounted to reciprocate, a crank journaled in said balance wheel, connecting rods connecting said pistons with said crank, and means rotating with the driving shaft and manually advanced and retarded in such rotation for actuating the valves to vary the port opening during the rotation of the valves and cylinders with the balance wheel.

7. The combination with a driving shaft, of a balance wheeel rigidly carried thereby, a reservoir carried by the balance wheel, said balance wheel being provided with conduits in communication with the reservoir, a plurality of cylinders carried radially by the balance wheel, a valve housing carried by each of said cylinders and in communication with the radially outer end of said cylinder, a conical valve mounted within the housing and provided with a port adapted at times to register with the conduit, a valve stem carried by the valve passing without the housing and journaled in parallel relation to the shafts, a driven shaft having a crank, pistons mounted to reciprocate within the cylinders, connecting rods from said piston to said crank, and means rotating with the driving shaft and manually advanced and retarded in such rotation for oscillating the valves the while the cylinders are rotating with the balance wheel.

FRANK W. WALTER, Jr.